(12) United States Patent
Bell et al.

(10) Patent No.: US 6,969,022 B2
(45) Date of Patent: Nov. 29, 2005

(54) SEAT BELT RETRACTOR

(75) Inventors: John Bell, Carlisle (GB); Brian Jack, Eastriggs (GB); Martyn Palliser, Carlisle (GB); Matthew Barber, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 220 days.

(21) Appl. No.: 10/683,704

(22) Filed: Oct. 14, 2003

(65) Prior Publication Data
US 2005/0087641 A1 Apr. 28, 2005

(51) Int. Cl.[7] .............................................. B65H 75/48
(52) U.S. Cl. ................... 242/379.1; 280/805
(58) Field of Search ..................... 242/379.1; 280/805; 297/472, 478

(56) References Cited

U.S. PATENT DOCUMENTS

| | | | |
|---|---|---|---|
| 6,131,843 A | 10/2000 | Singer et al. | |
| 6,598,822 B2 | 7/2003 | Nagata et al. | |
| 6,669,133 B2 | 12/2003 | Palliser et al. | |
| 6,698,678 B2 | 3/2004 | Hori et al. | |
| 2002/0050542 A1 | 5/2002 | Shinji et al. | |

FOREIGN PATENT DOCUMENTS

EP    1 180 457 A    2/2002

*Primary Examiner*—John Q. Nguyen
(74) *Attorney, Agent, or Firm*—Lonnie R. Drayer

(57) ABSTRACT

A seat belt retractor has a rotatable spool for retraction or payout of seat belt webbing wound thereon, depending upon the rotation direction of the spool. A locking wheel is attached to one end of the spool. The spool to is locked to the locking wheel when a crash is sensed. A force limiter allows further payout of the seat belt webbing after the spool has locked to the locking wheel, under the influence of a vehicle occupant's forward momentum. The force limiter includes a torsion bar attached at one end to the locking wheel and at the other end to the spool, and a secondary force limiter mechanism releasably coupled in the force path between the spool and the locking wheel, and a mechanism for de-coupling the secondary mechanism after a predetermined number of turns of the torsion bar. The locking mechanism has a locking element that is resiliently biased to a position wherein it locks the spool to the locking wheel and is held out of locking engagement by the secondary force limiting mechanism. The retractor is converted into a standard locking retractor after load limiting ensuring that the vehicle occupant is securely restrained against secondary impacts.

10 Claims, 6 Drawing Sheets

SEAT BELT RETRACTOR

FIELD OF THE INVENTION

The present invention relates to a seat belt retractor and particularly to a seat belt retractor with a load limiting function.

BACKGROUND OF THE INVENTION

Traditionally a seat belt retractor has a generally cylindrical spool on which seat belt webbing is wound. The spool is rotatably mounted to wind-up or pay out seat belt webbing, depending upon the direction of rotation. The spool is biased in the wind-up direction by a clock spring so that the seat belt maintains a relatively low level force on a vehicle occupant tending to pull him back into the vehicle seat in a comfortable manner, but allowing him to move forward to adjust a car radio and so forth. An acceleration sensor detects acceleration or deceleration above a predetermined level, as an indication of a crash, and locks the retractor against the further payout of webbing to securely restrain the vehicle occupant in the vehicle seat.

Modern seat belt systems include a load limiting function that allows some controlled payout of the belt webbing before locking fully, so as to more gradually decrease the momentum of the vehicle occupant. This is often achieved using a torsion bar mounted coaxially in the spool. The torsion bar twists about its own axis, after the spool mechanism is locked and typically allows up to two turns of the spool. In this way the crash forces felt by the vehicle occupant increase linearly as the crash forces increase, until the torsion bar begins to be twisted. The torsion bar stops twisting when the load applied from the vehicle occupant diminishes. The locking wheel is locked in position by the lockbar, but the spool can turn only when the torsion bar torsion bar is twisted allowing the spool to turn.

In an improved load-limiting seat belt retractor described in co-pending U.S. application Ser. No. 10/241,489, a second stage of operation is provided by a wire element housed in the spool body. The wire element works in parallel with the torsion bar to create a higher level of load limiting for a predetermined time or distance. Thus when the crash sensor first senses a crash a first stage of operation involves both the torsion bar twisting and the wire being either bent or twisted or pulled out of its housing in the spool to absorb the crash forces. Then the wire is fully bent, twisted or extended, depending on the mechanism employed. Then the crash forces are applied solely to the torsion bar and a second stage of operation involves only the torsion bar. This second stage with its lower level of load limiting works in conjunction with an airbag to share the load.

However, a disadvantage arises if a second impact occurs because the airbag has deployed due to the first impact and is no longer effective to share the restraining load with the seat belt retractor. Hence it is desirable for the seat belt retractor to revert to working as a standard non load-limiting retractor in the case of a second impact.

The present invention can provide the advantage of improving the crash force curve further and effectively restraining the vehicle occupant during a second impact.

SUMMARY OF THE INVENTION

There is provided in accordance with the present invention a seat belt retractor comprising: a rotatable spool having a spool body; a primary force limiting mechanism comprising a torsion bar attached at one end to a locking wheel and at the other end to the spool; and a secondary force limiting mechanism releasably coupled in a force path between the spool and the locking wheel and a means for de-coupling the secondary force limiting mechanism after a predetermined amount of twisting of the torsion bar due to a load applied by a vehicle occupant secured by a seat belt webbing that is at least partially wound upon the spool, and wherein a locking means comprises a locking element that is resiliently biased to a position wherein it locks the spool to the locking wheel and is held out of locking engagement by the secondary force limiting mechanism, the locking wheel has a recess therein along which the locking element slides and an abutment at an end of the recess against which the locking element rests.

Preferably the secondary mechanism comprises a wire releasably connected between the spool and the locking wheel.

Preferably the wire is releasably connected to the spool, preferably between the spool and the locking wheel.

The wire may be housed in at least one hole in the spool body and pulled out or extracted from the hole during load limiting. It may be drawn onto the locking wheel.

The thickness, length and composition of the wire are chosen to suit a vehicle's crash criteria.

DETAILED DESCRIPTION OF THE INVENTION

Figure 10:
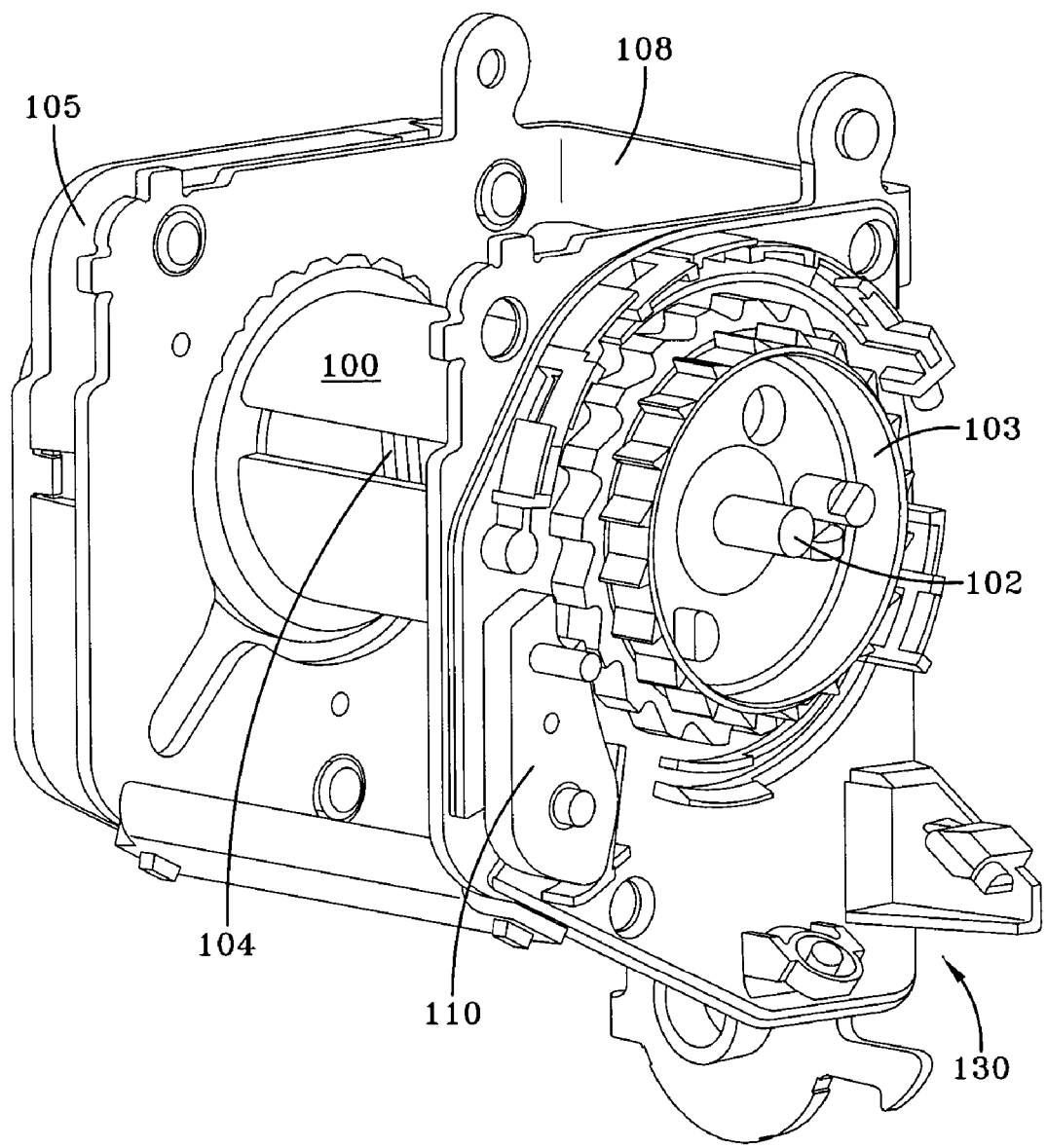
FIG. 10 is a perspective view of a prior art seat belt retractor that can be adapted to employ the present invention.

The seat belt retractor of the invention is of the general form used in a known seat belt retractor as shown in FIG. 10. The remaining figures show only the spool and locking assembly part of the seat belt retractor. It will be evident to a skilled person how this part is integrated into a full seat belt retractor. Such prior art seat belt retractors, as shown in FIG. 10, comprise a cylindrical retractor spool 100 mounted for rotation in a frame 108 to wind in and pay out seat belt webbing (not shown). A crash a sensor, positioned generally at 130, but not specifically illustrated, activates a locking mechanism to move a lockbar 110 to engage teeth on a locking ring 103 which is fixed to one end of the spool 100. Subject to further movement due to load limiting arrangements the spool 100 is then locked against further rotation. The other end of the spool is connected to a rewind spring mechanism 105 that comprises a clock type coiled spring that biases the spool 100 to a webbing rewind condition.

Figure 1:
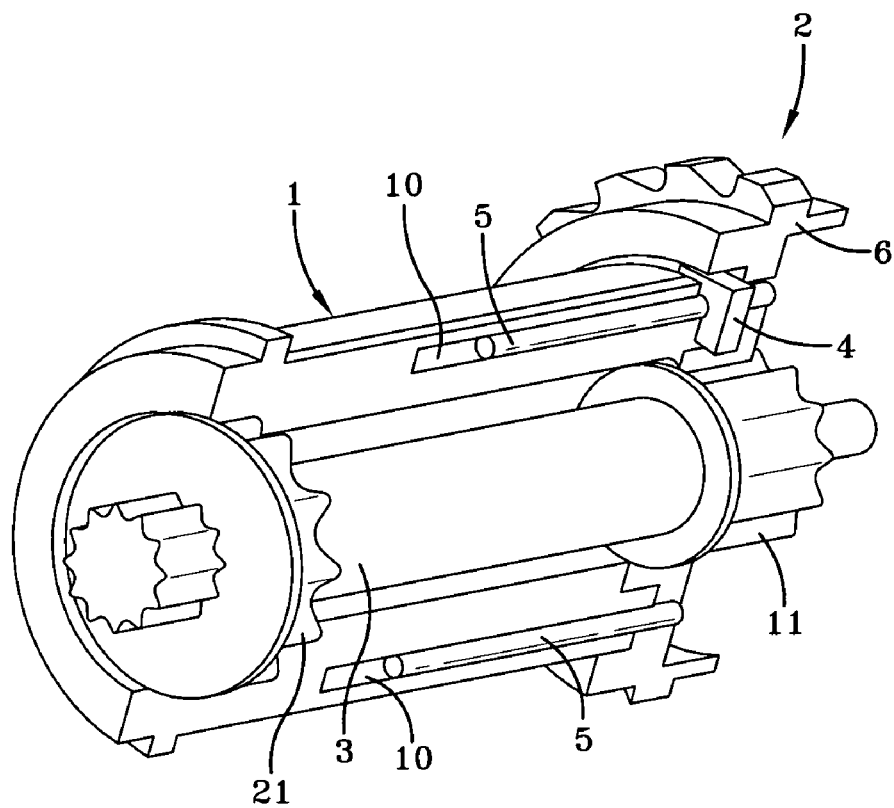
FIG. 1 is a partially cut-away perspective view of the spool and locking assembly of a seat belt retractor according to the present invention.

FIG. 1 is a partially cut-away perspective view of the spool and locking assembly of a seat belt retractor according to the present invention. In FIG. 1 a hollow spool 1 is shown partially cut-away with a locking assembly 2 at one end and a torsion bar 3 arranged along its axis. The torsion bar 3 is fixed to the spool 1 at the left end as shown in FIG. 1 by splines 21. The torsion bar is fixed to the locking assembly 2 at the left end as shown in FIG. 1 by splines 11 fitting in a correspondingly shaped hole in the locking assembly 2. Although not shown, seat belt webbing is wound around the outside of the spool 1 and the spool is supported in a frame for rotation about its longitudinal axis. A rewind spring for the spool 1 is mounted to the left end, as shown in FIG. 1.

A secondary locking means is shown comprising a length of load limiting wire 5 having its end portions extending into two holes 10 in the spool body 1 and passing through a locking element 4 and through a locking wheel 6 forming part of the locking assembly 2.

Figure 2:
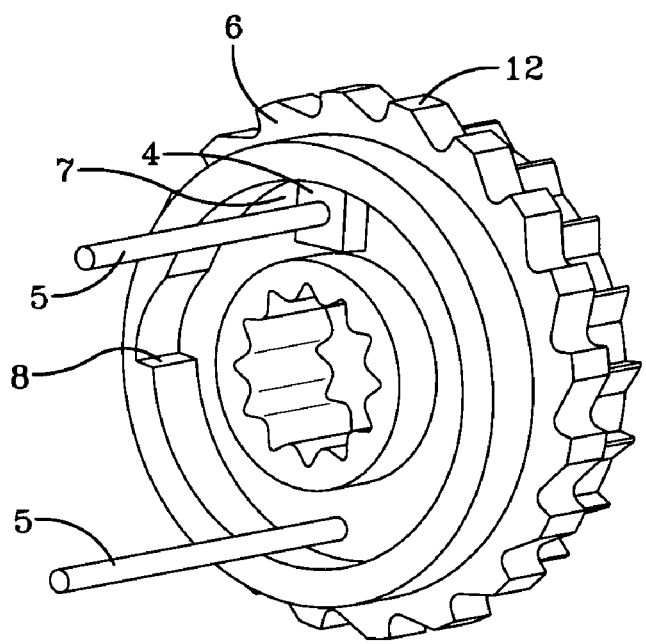
FIG. 2 is a perspective view of a locking wheel assembly for one end of the seat belt retractor of FIG. 1.

FIG. 2 is a perspective view of a locking wheel assembly for one end of the seat belt retractor of FIG. 1. The orientation of the wire is shown more clearly in FIG. 2 wherein the wire 5 extends axially through and beyond the locking wheel 6 to be received in the holes 10 in the spool. As used herein and in the claims the terms "axial" and "axially" are understood to refer to orientations of components either along or substantially parallel to the axis of rotation of the spool when the spool is mounted in a retractor frame.

The wire 5 holds the locking element 4 out of engagement with the locking wheel 6 against the action of a spring load.

If a crash a sensor attached to the seat belt retractor detects a sudden change in speed or direction of the vehicle a lock bar (not shown) is moved to engage teeth 12 on the locking wheel 6 to lock the spool 1 against rotation, subject to movement due to load limiting arrangements. A lock bar can be seen in the prior art retractor shown FIG. 10 and is identified by reference character 110. Once the spool 1 is locked the crash force transfers to the torsion bar 3 and above a predetermined value causes the torsion bar to twist about its axis allowing the spool 1 to rotate under conditions determined by the properties of the torsion bar 3. Usually the spool 1 rotates up to two additional turns.

During this time the wire 5 is also being pulled out of the holes 10 in the body of the spool 1 providing an additional secondary load limiting effect during a first stage of operation. The combination of the torsion bar 3 and the secondary load limiting wire 5 raises the initial load limiting threshold giving a higher combined level of load limiting than the torsion bar alone, i.e. holding the vehicle occupant back in his seat until an airbag is fully deployed to share the restraining load.

At the end of the first stage (identified in the graph in FIG. 9), at the point where the airbag is fully deployed, the wire 5 has been fully pulled out of the holes 10 in the spool body 1 releasing the locking element 4 to eject into the locking wheel 6 and engage into a recess 7 in the locking wheel 6. Thus during a second stage (identified in the graph in FIG. 9) the locking wheel 6 continues to turn under the influence of the crash forces until the locking element 4 reaches an abutment 8 at the end of the recess 7. At this point the locking element 4 connects the spool 1 and the locking wheel 6 together preventing any further load limiting and this constitutes a third stage of operation (identified in the graph in FIG. 9). The length of the recess 7 and the position of the abutment 8 can be varied to modify the crash curve as required by a vehicle manufacturer's specification, by providing a longer or shorter dwell period at the torsion bar only load level (second stage). Ideally the abutment 8 isn't reached in a first impact.

In the third stage of operation (identified in the graph in FIG. 9) the seat belt retractor functions as a standard retractor without any load limiting function and will restrain the vehicle occupant appropriately for a second impact. This is particularly important because the airbag will usually have deployed in a first impact and thus the seat belt is the only restraint acting on the vehicle occupant.

Figure 3:
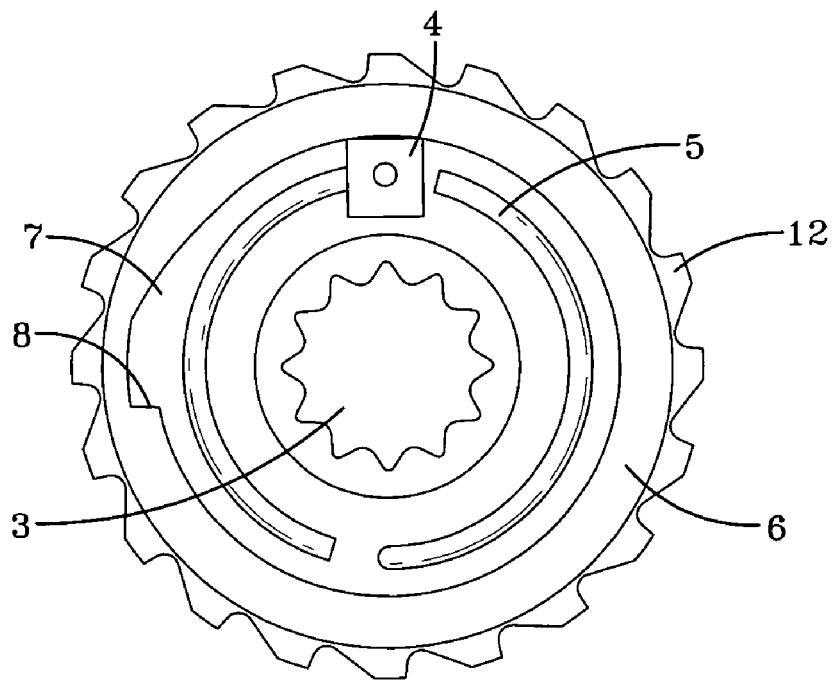
FIG. 3 is an end view of the locking mechanism shown in FIG. 2 during a first stage of operation labeled as stage one in the graph of FIG. 9 when load limiting is provided by primary and secondary load limiting mechanisms working together.
Figure 4:
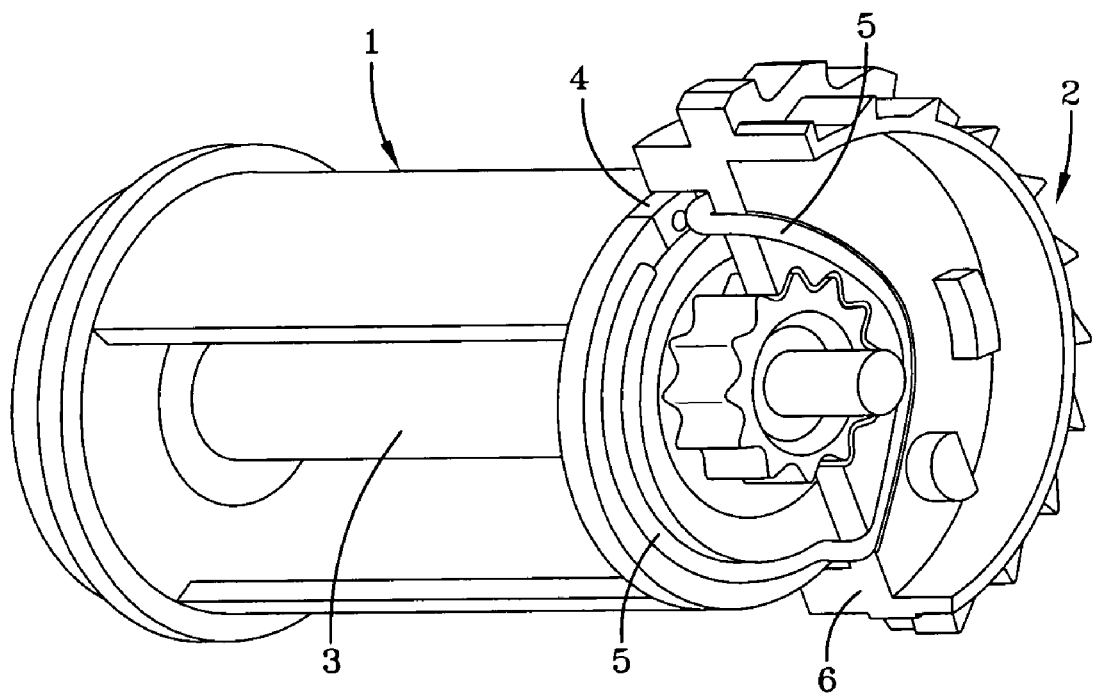
FIG. 4 is a partially cut-away view of the spool and locking assembly of FIG. 1 from the locking wheel end during a first stage of operation labeled as stage one in the graph of FIG. 9 when load limiting is provided by primary and secondary load limiting mechanisms working together.
Figure 5:
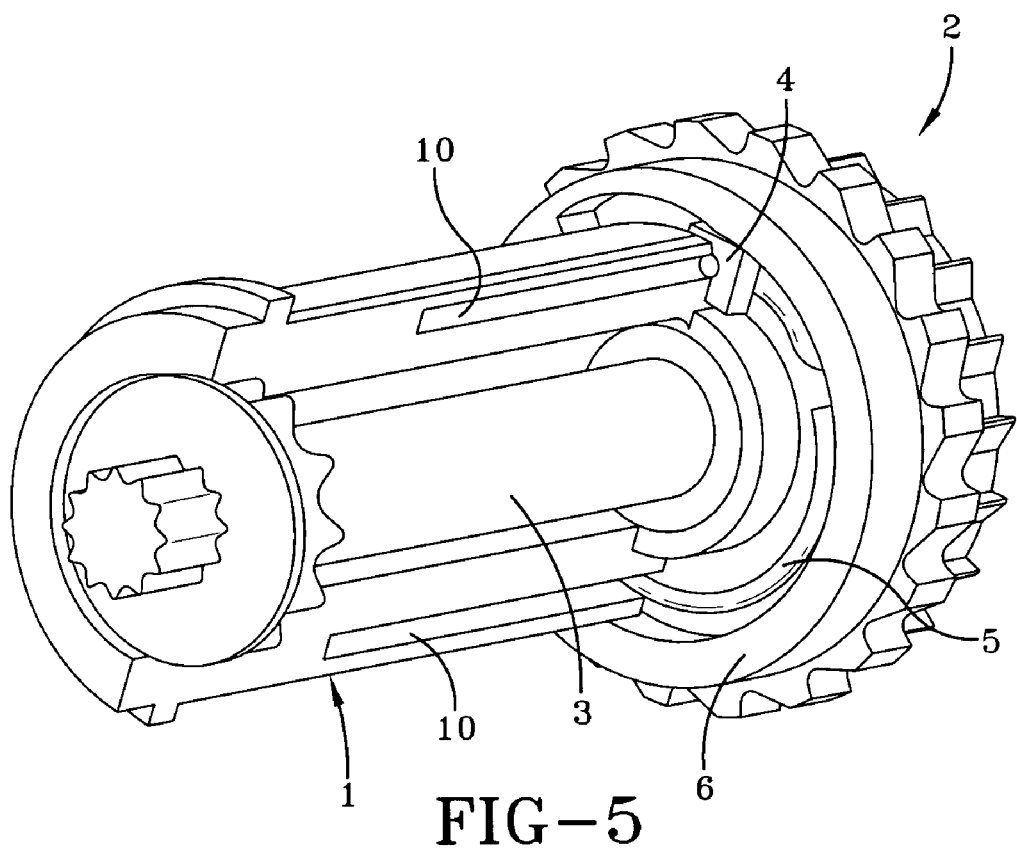
FIG. 5 is a partially cut-away perspective view of the seat belt retractor of FIG. 1 during a second stage of operation labeled as stage two in the graph of FIG. 9 when load limiting is provided only by the primary load limiting mechanism.
Figure 6:
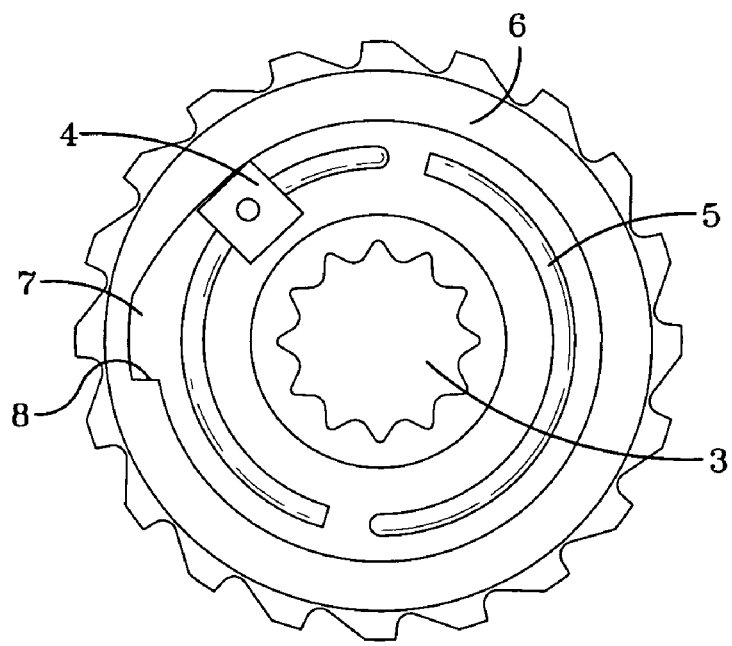
FIG. 6 shows the locking wheel end of the seat belt retractor of FIG. 5 during a second stage of operation labeled as stage two in the graph of FIG. 9 when load limiting is provided only by the primary load limiting mechanism.

FIGS. 3 and 4 show the end of the first stage of operations (identified in the graph in FIG. 9) wherein the wire 5 has been fully pulled out of the holes 10 in the body of the spool 1 and bent around into a space in the locking wheel 6. At this point the locking element 4 is released from the body of the spool 1 and its spring load ejects it into the recess 7 in the locking wheel 6 to connect the spool to the locking wheel 6 and start the second stage of load limiting. The spool 1 continues to turn under the influence of crash forces as the torsion bar continues to twist and the locking element 4 moves relative to the locking wheel 6 as shown in FIG. 6 by sliding along the recess 7 until it reaches the stop abutment 8.

Figure 7:
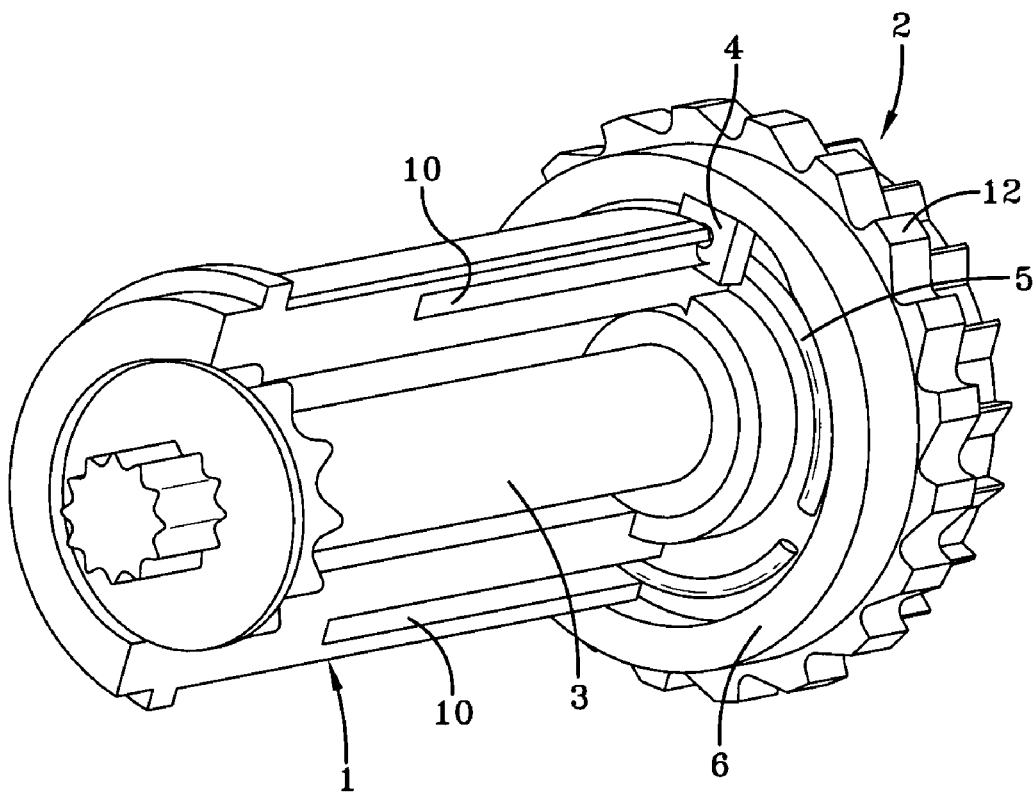
FIG. 7 is a partially cut-away perspective view of the seat belt retractor of FIG. 1 during a third stage of operation labeled as stage three in the graph of FIG. 9 when a locking mechanism engages the spool and locking wheel and there is no load limiting.
Figure 8:
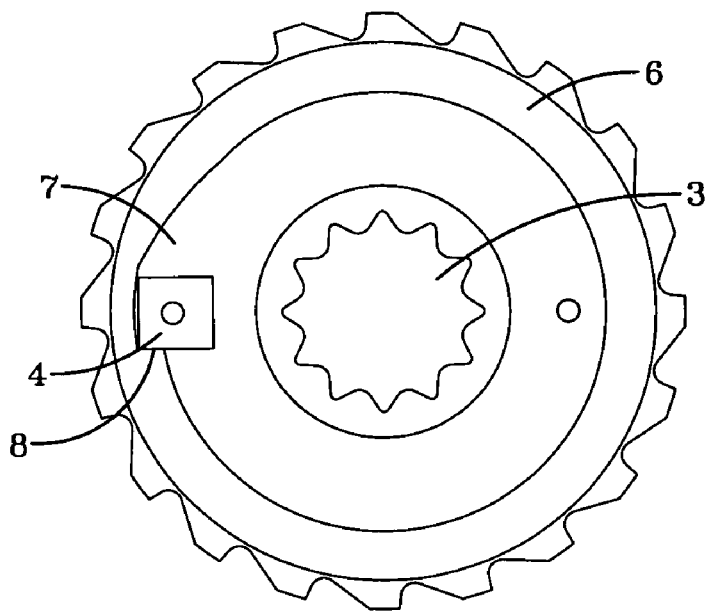
FIG. 8 shows the locking wheel end of the seat belt retractor of FIG. 7 during a third stage of operation labeled as stage three in the graph of FIG. 9 when a locking mechanism engages the spool and locking wheel and there is no load limiting.

When the locking element 4 contacts the abutment 8 as shown in FIGS. 7 and 8 the locking element 4 is locked with the locking wheel 6 and no further load limiting is effective. This third stage (identified in the graph in FIG. 9) puts the retractor into a standard operational format whereby the spool 1 is locked against webbing payout and thus restrains the vehicle occupant effectively against secondary crash forces.

Figure 9:
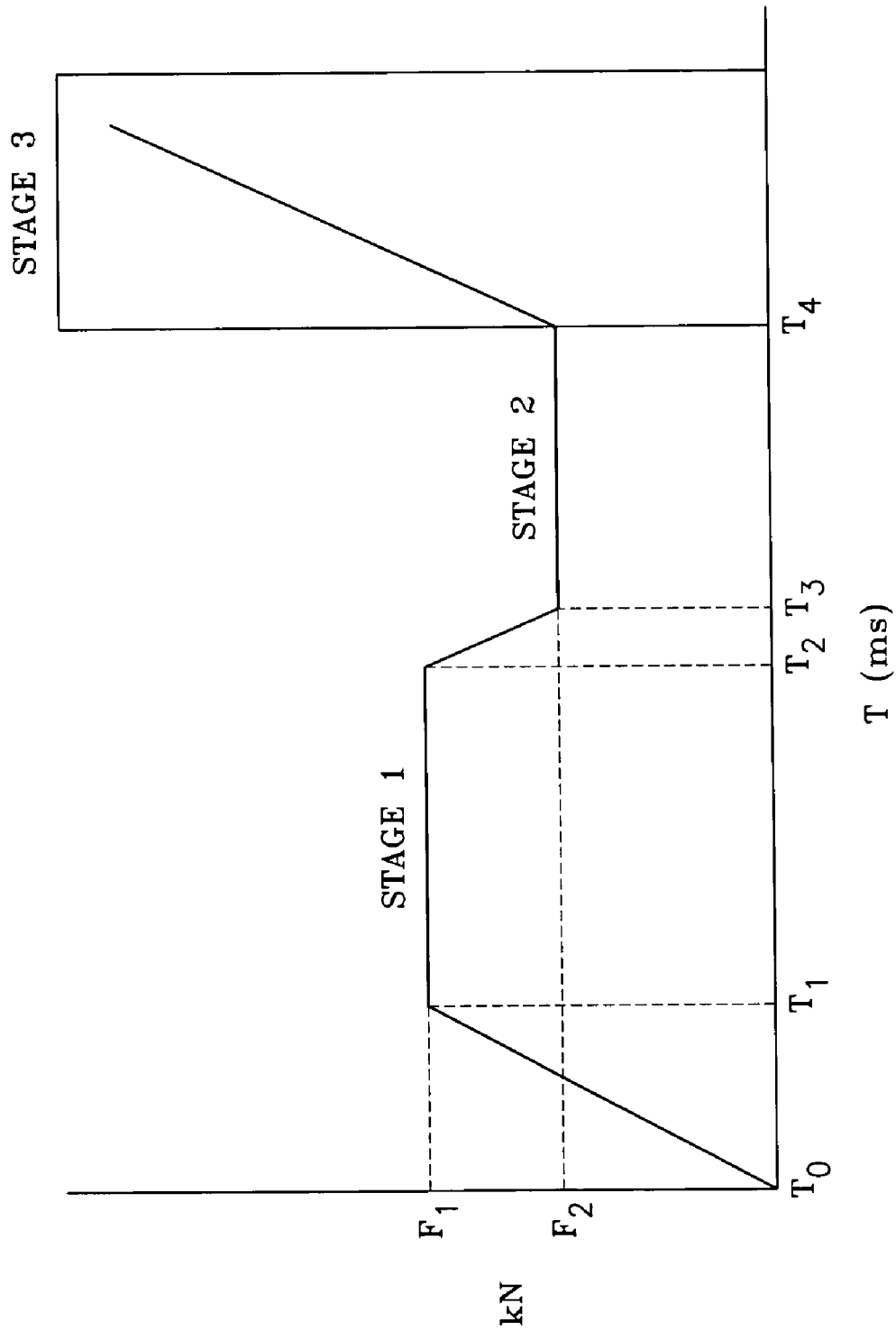
FIG. 9 is a graph of force against time showing various stages of operation of the seat belt retractor.

FIG. 9 is a digressive load limiting graph showing how a vehicle occupant feels a crash force over a period of time. At $T_0$ a crash occurs causing a sudden deceleration or change of direction of the vehicle which is detected by a crash sensor and brings the locking mechanism into effect. During the period $T_0$ to $T_1$ the crash forces on the vehicle occupant increase linearly to a force level $F_1$. At $T_1$ the first stage of operation comes into effect provided by the wire 5 and the torsion bar 3 acting together to provide load limiting and the force levels out at $F_1$ during the period $T_1$ to $T_2$. At time $T_2$ the wire 5 is fully extended and the locking element 4 is released to move relative to the locking wheel 6. Thus the force felt by the vehicle occupant decreases to a level $F_2$ provided by the torsion bar 3 alone. During the second stage over the period $T_3$ to $T_4$ only the torsion bar provides load limiting while the locking element 4 moves around the recess 7. At time $T_4$ the locking element 4 engages the abutment 8 and locks the seat belt retractor fully, preventing further twisting of the torsion bar 3. From time $T_4$ onwards the seat belt retractor is fully locked and acting as a standard seat belt retractor with no load limiting. The vehicle occupant will feel linearly increasing forces during this third stage. However, by this time the crash forces from the primary impact will usually have dissipated. The graph shows the situation for a secondary impact at around time $T_4$.

Although this invention has been described by way of example and with reference to possible embodiments thereof, it is to be understood that modifications and improvements may be made without departing from the spirit or scope of the invention.

What is claimed is:

1. A seat belt retractor comprising:
   a rotatable spool having a spool body;
   a primary force limiting mechanism comprising a torsion bar attached at one end to a locking wheel and at the other end to the spool; and
   a secondary force limiting mechanism releasably coupled in a force path between the spool and the locking wheel and a means for de-coupling the secondary force limiting mechanism after a predetermined amount of twisting of the torsion bar due to a load applied by a vehicle occupant secured by a seat belt webbing that is at least partially wound upon the spool, and wherein a locking means comprises a locking element that is resiliently biased to a position wherein it locks the spool to the locking wheel and is held out of locking engagement by the secondary force limiting mechanism, the locking wheel has a recess therein along which the locking element slides and an abutment at an end of the recess against which the locking element rests.

2. A seat belt retractor according to claim 1 wherein the secondary force limiting mechanism comprises a wire releasably connected between the spool and the locking wheel.

3. A seat belt retractor according to claim 2 wherein the wire is releasably connected to the spool.

4. A seat belt retractor according to claim 2 wherein the wire is housed in a hole in the spool body from which it is pulled during load limiting.

5. A seat belt retractor according to claim 3 wherein the wire is housed in a hole in the spool body from which it is pulled during load limiting.

6. A seat belt retractor according to claim 2 wherein the wire is drawn onto the locking wheel during load limiting.

7. A seat belt retractor according to claim 3 wherein the wire is drawn onto the locking wheel during load limiting.

8. A seat belt retractor according to claim 4 wherein the wire is drawn onto the locking wheel during load limiting.

9. A seat belt retractor according to claim 5 wherein the wire is drawn onto the locking wheel during load limiting.

10. A seat belt retractor according to claim 2 wherein a thickness, length and composition of the wire are chosen to suit a vehicle's crash criteria.

\* \* \* \* \*